United States Patent Office 3,255,101
Patented June 7, 1966

3,255,101
HYDROCRACKING PROCESS WITH THE USE OF A CRYSTALLINE ZEOLITE CONTAINING IRON
William Floyd Arey, Jr., William Claus Behrmann, and William Judson Mattox, Baton Rouge, La., assignors to Esso Research and Engineering Company, a corporation of Delaware
No Drawing. Filed June 20, 1963, Ser. No. 289,440
4 Claims. (Cl. 208—111)

This invention relates to a hydrocracking process wherein hydrocarbon oils are cracked in the presence of added hydrogen while in contact with a hydrogenating catalyst. The invention is concerned more particularly with an improvement in such process utilizing a more effective and efficient catalyst for carrying out the hydrocracking operation.

The destructive hydrogenation, or hydrocracking of petroleum products, is an old and well-known refining process. Originally the catalysts commonly used for the process were compounds of metals of the 6th and 8th groups of the Periodic system, such as the oxides and sulfides of tungsten, nickel, cobalt and manganese, and mixtures thereof.

More recently, substantial improvements have been made in the operating procedure and improved catalysts have been developed.

Chemically the hydrocracking reaction involves a synergistic combination of two basic reactions, hydrogenating and cracking. Olefins and aromatics, which normally result from simple cracking in the absence of added hydrogen and a hydrogenating catalyst, are hydrogenated to form paraffins and naphthenes so that the lower boiling products resulting from the cracking operation consist predominantly of isoparaffins and naphthenes.

The principal object of the invention is to provide an improved catalyst for hydrocracking which will result in better yields of high grade products, such as gasoline and light distillates, with a corresponding reduction in yields of low grade products such as dry gas and coke.

The catalyst used in accordance with this invention comprises a crystalline metallo alumino-silicate containing iron as one of the essential components thereof. Further, the crystalline metallo alumino-silicate has uniform pores ranging in size between 8 and 15 Angstroms. The mole ratio of silica to alumina in the catalyst should be at least 3 and preferably between about 4 and about 6.

The crystalline metallo alumino-silicate of the type described above is made up of an anionic network with cations interspersed within the network to establish electrical neutrality. These cations are usually in the form of alkali or alkali metal ions, but these ions may be replaced by other metals by simple base exchange reactions.

While the crystalline alumino-silicates of this type exist in nature, usually in the form of hydrated sodium or calcium alumino-silicates or mixtures thereof, the supply of the natural product is limited.

More recently, methods have been developed for commercially synthesizing these products. These methods usually involve the preparation of the sodium form of crystalline alumino-silicates in which the molar ratio of sodium oxide to alumina is about 1.

The preparation of the products usually involves reacting a mixture of sodium hydroxide, sodium aluminate, and sodium silicate. By changing the relative concentrations of these ingredients and controlling the temperature and other conditions, products of different pore sizes may be prepared.

For example, the Kimberlin et al. Patent 2,971,903 described a preparation of products having pore sizes of 4, 5 and 13 Angstroms.

As pointed out in this patent, and elsewhere, products having the smaller pore sizes of 4 and 5 Angstroms will only allow the smaller size hydrocarbon molecules, such as straight-chain paraffins and olefins, to enter the pores and thereby be exposed to the internal active sites of the catalyst.

The improved catalyst to be used in the present invention should have pore sizes large enough to permit other types of hydrocarbons, as well as straight-chain paraffins and olefins, to enter the pores.

The catalyst forming the present invention should also have a molar ratio of silica to alumina of at least 3 and preferably between 4 and 6. These high silica products are stronger and more stable under hydrocracking conditions. Furthermore, the higher silica product better maintains its crystallinity during the reaction with the iron as later described and is a more active hydrocracking catalyst.

The hydrocracking process in its broader aspects involves the passing of a hydrocarbon feed stock in admixture with hydrogen in contact with the hydrocracking catalyst at suitable temperatures, pressures, feed rates, etc., to effect a substantial conversion of the feed to lower boiling materials.

The catalyst used in the present invention is capable of producing a high percentage of gasoline and light distillate from a given amount of feed converted.

The hydrocarbons used as feed stock in the process may include various higher boiling petroleum fractions such as whole crude, reduced or topped crude, distillate products obtained from straight distillation or cracking of heavier fractions, shale oils obtained by distillation and retorting of oil shales or tar sands. The feed stock may also be a synthetic oil obtained by coal hydrogenation or oils synthesized from carbon monoxide and hydrogen by the Fischer-Tropsch process.

Suitable temperatures for hydrocracking employing the present catalyst will usually range within 600 to 1,000° F. and the pressures within the range of 500 to 3,000 p.s.i.g. The amount of hydrogen mixed with the feed may be between 500 and 25,000 cubic feet per barrel of feed.

The specific conditions to be employed for carrying out the process will depend to a large degree on the type of feed being hydrocracked.

The hydrocracking process may be carried out with a fixed or fluidized bed of catalyst permanently positioned within the reactor, or the catalyst may be circulated through the reactor as a moving bed or in the form of a fluidized mixture of catalyst suspended in the feed or other gases or liquid. When the catalyst is used in fixed or moving bed type units, it is usually in the form of pellets or pills. When used in the fluidized operation the catalyst is usually in finely divided form having an average particle size ranging from about 20 to 200 microns.

The invention will be best understood by reference to the following illustrated examples:

*Example 1.—Sodium alumino-silicates*

A solution of 6,870 grams of 97% NaOH and 1,513 grams of sodium aluminate in 27 liters of water was added with stirring to 37.6 kg. of low soda Ludox (30% $SiO_2$; weight ratio $Na_2O/SiO_2$ 1:285) contained in a 20-gallon porcelain crock. Stirring was continued until the mixture was homogeneous. The slurry was then transferred to a 72-liter round-bottom flask with a reflux condenser and was heated to 176–204° F. for 48 hours to effect crystallization. The bulk of the aqueous layer was decanted and the crystalline material separated from the remainder of the solution by filtration. The sodium alumino-silicate was washed until the wash water had a pH of 9.3 and analyzed, after drying, 13.9% $Na_2O$, 58.3% $SiO_2$, and 23.1% Al$_2$O$_3$. On a mole basis this analysis corresponds to: 0.99 Na$_2$O:1.00 Al$_2$O$_3$:4.4 SiO$_2$.

A 1,000 gram portion of the above sodium aluminosilicate powder was contacted with a solution of 900 g. of FeCl$_2$·4H$_2$O in 2 liters of water for two hours at 150° C. After filtration, a fresh FeCl$_2$ solution was added and the exchange repeated. After a third and final exchange, the catalyst was washed free of chloride ion and oven dried at 230° F. The exchanged zeolite contained 4.2% Na$_2$O, 10.3% FeO, and had a silica/alumina ratio of 4.7. The powdered material was pilled and then calcined at 800–1,000° F. and tested for hydrocracking activity.

*Example 2*

The catalyst prepared in Example 1 was tested for hydrocracking activity by passing a West Texas atmospheric residuum boiling above about 430° F. at a temperature of 800° F., a pressure of 1500 p.s.i.g., and at a hydrogen feed rate of 14,000 cubic feet of hydrogen per barrel. The results of this test are reported in Table I appearing hereafter.

*Example 3*

The same feed stock was cracked under similar conditions of temperature, pressure, and hydrogen rate at various feed rates in the presence of a conventional commercial cobalt molybdate catalyst supported on alumina. This catalyst contained 12.5 wt. percent MoO$_3$ with 0.4 mole Co/mole of Mo and had a surface area of 256 square meters/gram. The results of this test are compared with the results obtained under conditions of Example 2 when operating at a given severity expressed as the equal conversion of residuum boiling above 900° F. to lower boiling hydrocarbons.

Table I below shows the comparative results obtained when using a catalyst prepared according to Example 1 and the conventional type of catalyst used in Example 3.

TABLE I

| Fraction | Feed Composition West Texas Atm. Residuum | Hydrocracking Product Distribution | |
|---|---|---|---|
| | | Ex. I Catalyst | Co-Mo/-Al$_2$O$_3$ |
| C$_2$–C$_3$, Wt. percent | | 4 | 1 |
| C$_4$, Vol. percent | | 9 | 1 |
| C$_5$–430° F., Vol. percent | 0.8 | 18 | 6 |
| 430–650° F., Vol. percent | 13.4 | 16 | 26 |
| 650–900° F., Vol. percent | 33.8 | 28 | 43 |
| 900° F.+, Vol. percent | 52.0 | 28 | 28 |

The above data show that the iron-exchanged catalyst forming the present invention gives a much higher yield of gasoline (C$_5$–430° F.) than the conventional cobalt molybdate catalyst.

*Example 4*

The effect of the silica-alumina ratio on the crystallinity of the iron alumino-silicate is shown in the following Table II.

TABLE II

| SiO$_2$/Al$_2$O$_3$ Mole Ratio | 2.5 | 4.4 | 5.2 |
|---|---|---|---|
| Crystallinity of Fe-Alumino-Silicate | 0 | 40 | 53 |

What we claim to be our invention is:

1. A process for hydrocracking hydrocarbons which comprises passing said hydrocarbons in admixture with hydrogen through a hydrocracking zone maintained at hydrocracking conditions of temperature and pressure, contacting said hydrocarbons within said zone with a hydrocracking catalyst comprising a crystalline metallo alumino-silicate having uniform pore sizes between about 8 and 15 Angstroms and a silica to alumina molar ratio of at least 3 and having iron incorporated therein by cation exchange, and maintaining said hydrocarbons in contact with said catalyst for a period sufficient to convert a substantial portion of said hydrocarbons into lower boiling products.

2. The invention defined in claim 1 wherein the catalyst has a molar ratio of silica to alumina between about 4 and about 6.

3. A process for hydrocracking hydrocarbons which comprises passing the hydrocarbons in admixture with hydrogen through a hydrocracking zone maintained at a temperature between 600 and 1,000° F. and at a pressure between 500 and 3,000 p.s.i.g., contacting said hydrocarbons within said zone with a catalyst comprising a dehydrated crystalline metallo alumino-silicate having a silica to alumina molar ratio of at least 3 and a uniform pore size ranging between 8 and 15 Angstroms and having iron incorporated therein, said catalyst having been prepared by first forming a sodium alumino-silicate and thereafter exchanging at least a part of the sodium with iron and maintaining the hydrocarbons in contact with the catalyst for a period sufficient to convert a substantial portion thereof into lower boiling products.

4. The process defined in claim 3 wherein the catalyst has a molar ratio of silica to alumina of between about 4 and about 6.

References Cited by the Examiner

UNITED STATES PATENTS

| 2,983,670 | 5/1961 | Seubold | 208—110 |
| 3,119,763 | 1/1964 | Haas et al. | 208—109 |
| 3,130,006 | 4/1964 | Rabo et al. | 23—110 |
| 3,140,253 | 7/1964 | Plank et al. | 208—120 |

DELBERT E. GANTZ, *Primary Examiner.*

ALPHONSO D. SULLIVAN, *Examiner.*

A. RIMENS, *Assistant Examiner.*